United States Patent [19]
Andoh

[11] Patent Number: 5,130,583
[45] Date of Patent: Jul. 14, 1992

[54] LINEAR MOTOR

[75] Inventor: Toshiyuki Andoh, Sagamihara, Japan

[73] Assignee: Ricoh Company, Ltd., Tokyo, Japan

[21] Appl. No.: 610,571

[22] Filed: Nov. 8, 1990

[30] Foreign Application Priority Data

| Nov. 13, 1989 | [JP] | Japan | 1-294244 |
| Nov. 17, 1989 | [JP] | Japan | 1-298977 |
| Jan. 22, 1990 | [JP] | Japan | 2-12375 |

[51] Int. Cl.⁵ .............................................. H02K 41/00
[52] U.S. Cl. .................................. 340/12; 310/13; 318/135
[58] Field of Search ................ 310/12, 13, 14, 15, 310/68 R; 318/135, 687, 685; 104/290, 292

[56] References Cited

U.S. PATENT DOCUMENTS

| 4,151,447 | 4/1979 | von der Heide et al. | 318/135 |
| 4,484,671 | 9/1983 | Kuribayashi et al. | 318/678 |
| 4,789,815 | 12/1988 | Kobayashi et al. | 318/135 |
| 4,823,062 | 4/1989 | Huffman et al. | 318/678 |
| 4,912,746 | 3/1990 | Oishi | 310/12 |
| 4,965,864 | 10/1990 | Roth et al. | 310/12 |
| 5,023,495 | 6/1991 | Ohkaka et al. | 310/12 |
| 5,047,676 | 9/1991 | Ichikawa | 310/12 |

FOREIGN PATENT DOCUMENTS 59-86473 5/1984 Japan ............................ 310/12

Primary Examiner—Steven L. Stephan
Assistant Examiner—Matthew Nguyen
Attorney, Agent, or Firm—Oblon, Spivak, McClelland, Maier & Neustadt

[57] ABSTRACT

A linear motor that comprises: a stator constituting a running track and having a longitudinal direction; a movable body disposed on the stater and being linearly movable along said longitudinal direction of the stator; an end detection sensor for detecting a state that the movable body disposed on the stator and being linearly stator; a drive circuit for driving the movable body to move on the stator; a control circuit for controlling the drive circuit and outputting a drive signal to the drive circuit to move and stop the movable body; and an overrun prevention circuit for preventing the movable body from overrunning out of the stator. The overrun prevention circuit is connected from said end detection sensor.

6 Claims, 8 Drawing Sheets

LINEAR MOTOR

BACKGROUND OF THE INVENTION

1. Field of the Invention

The present invention relates to a moving magnet type linear motor or a moving coil type linear motor.

2. Description of the Related Art

A linear motor is comprised of an assembly of a coil and a magnet, one constituting a stator while the other constituting a moving body (movable body) which is driven linearly. Both the moving coil and moving magnet type linear motors are controlled substantially in the same way. However, to clarify the invention, the two types of the motors are explained respectively hereinafter.

An example of the moving coil type linear motor is disclosed in Japanese Patent Application Laying Open (KOKAI) No. 59-70178.

The moving coil type linear motor is composed of a movable body and a stator. The movable body comprises a yoke, a coil support attached to the bottom of the yoke, axles disposed at the four corners of the yoke, with wheels each being rotatably attached to each axle, and an armature comprising three coil wirings disposed on the lower surface of the coil support in a side by side arrangement continuously along the moving direction of the movable body. Each of the coil wirings is connected to a terminal (not shown) in a connector through a printed wiring pattern formed on the coil support. The connector is connected to a control circuit (not shown) of a CPU (Central Processing Unit).

On the other hand, the stator comprises a longitudinal base plate having a guide step (or groove) along each side thereof for guiding the wheels of the movable body, a stator yoke fixed along the longitudinal center line of the base plate, and a number of magnets disposed on the stator yoke. Each magnet has a strip shape having a longitudinal direction disposed in the lateral transverse direction of the base plate. The magnets are arranged so that the poles N and S are alternately disposed along the longitudinal direction of the base plate. The armature is disposed facing to the magnets through a predetermined gap formed therebetween.

A hall element for changing the magnetic field is arranged corresponding to each of the coil wirings disposed on the lower surface of the coil support. The hall element is connected to the control circuit of the CPU through a terminal of the connector.

For the operation of the above mentioned structure of a linear motor, a driving current is applied to the coil wirings through the connector from an outside drive circuit so that the movable body is linearly driven to move on the stator due to the magnetic effect generated between the armature and the magnets.

It is to be noted that each hall element detects the electric field generated from the magnet facing to the element. The detection signal is transmitted to the control circuit of the CPU so as to control the timing of changing the energizing the magnets. Therefore, it is possible to detect the position of the movable body without using a brush.

On the other hand, an example of the moving magnet type linear motor is also disclosed in Japanese Patent Application Laying Open (KOKAI) No. 59-70178.

A moving magnet type DC linear motor is composed of a moving body (movable body) and a stator. The moving body comprises a yoke having a U-shaped section, magnets attached to the lower surface of the yoke, and wheels rotatably attached to each of axles disposed at the four corners of the yoke. The magnets are arranged so that the poles N and S are alternately disposed along the longitudinal direction of the stator.

On the other hand, the stator comprises a longitudinal base plate having a guide step (or groove) on either side thereof for guiding the wheels, a stator yoke fixed on the base plate along the longitudinal center line thereof, a plurality of armatures continuously disposed on the yoke each armature being composed of a coil, and hall elements for changing the magnetic field each disposed on one side of each armature.

The coils formed on the stator face to the magnet of the moving body through a predetermined gap. Each coil along with the hall element is connected to a drive control circuit of a CPU.

To function the above-mentioned construction of the moving magnet type linear motor, a current is selectively applied to a coil so that the moving body is linearly moved on the stator due to the magnetic effect between the coil and the magnet.

It is to be noted that in accordance with the above-mentioned structure of the moving magnet type linear DC motor, each hall element detects the magnetic field generated from the magnet facing to the coil and the detection signal is transmitted from the hall element to the drive control circuit of the CPU so that it becomes possible to detect the position of the moving body without using a brush.

In accordance with the above-mentioned moving coil or moving magnet type linear DC motor, the current supply from the drive control circuit to each of the coils is controlled by the CPU in accordance with the program arranged in the CPU so as to desirably drive the moving body to move linearly.

However, the control signal from the CPU is sometimes disturbed by the noise from outside, which results in malfunction of the coils and makes the moving body uncontrollable. This causes that the moving body overruns the stator out of the base plate and damages the motor system.

SUMMARY OF THE INVENTION

It is therefore an object of the present invention to provide a linear motor comprising a movable body which is reliably controlled with a simple construction.

The above-mentioned object of the present invention can be achieved by a linear motor comprising:

a stator constituting a running track and having a longitudinal direction;

a movable body disposed on the stator and being linearly movable along the longitudinal direction of the stator;

an end detection sensor for detecting a state that the movable body is positioned at around an end of the stator;

a drive circuit for driving the movable body to move on the stator;

a control circuit for controlling the drive circuit and outputting a drive signal to the drive circuit to move and stop the movable body; and an overrun prevention circuit for preventing the movable body from overrunning out of the stator, the overrun prevention circuit being connected from the end detection sensor.

An advantage of the above-mentioned linear motor is that it becomes possible to securely avoid the overrun of the movable body and prevent the motor from being damaged with a simple structure and without impairing the normal function of the motor.

Further objects and advantages of the present invention will be apparent from the following description of the preferred embodiments of the invention as illustrated in the accompanying drawings.

DESCRIPTION OF THE PREFERRED EMBODIMENTS

Figure 1:
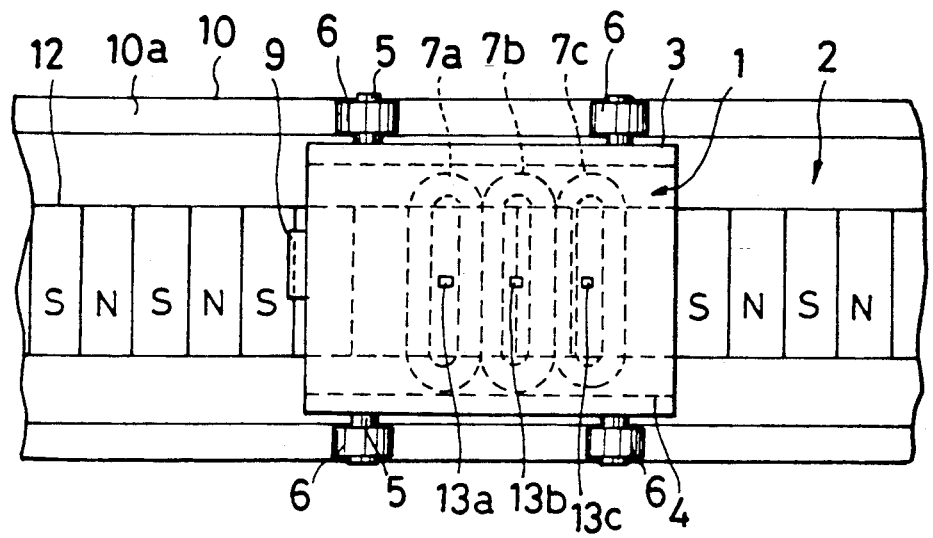
FIG. 1 is a plan view of an example of the moving coil type linear motor in accordance with the related art.

Embodiments of the present invention are described hereinafter with reference to the drawings in comparison to the related art which is also illustrated in the drawings.

The present invention is an improvement over the related art illustrated.

An example of the moving coil type linear motor is described with reference to FIGS. 1 to 3.

The moving coil type linear motor is composed of a moving body 1 and a stator 2. The moving body 1 comprises a yoke 3, a coil support 4 attached to the bottom of the yoke 3, axles 5 disposed at the four corners of the yoke 3, wheels 6 each rotatably being attached to each axle 5, and an armature 7 comprising three coil wirings 7a, 7b and 7c disposed on the lower surface of the coil support 4 side by side continuously along the moving direction of the moving body 1. Each of the coil wirings 7a, 7b and 7c is connected to a terminal (not shown) in a connector 9 through a printed wiring pattern 8 formed on the coil support 4. The connector 9 is connected to a control circuit (not shown) of a CPU (Central Processing Unit).

On the other hand, the stator 2 comprises a longitudinal base plate 10 having a guide step (or groove) 10a along each side thereof for guiding the wheels 6 of the moving body 1, a stator yoke 11 fixed along the longitudinal center line of the base plate 10, and a number of magnets 12 disposed on the stator yoke 11. Each magnet 12 has a strip shape having a longitudinal direction disposed in the lateral transverse direction of the base plate 10. The magnets 12 are arranged so that the poles N and S are alternately disposed along the longitudinal direction of the base plate 10. The armature 7 is disposed facing to the magnets 12 through a predetermined gap formed therebetween.

A hall element 13a, 13b, 13c for changing the magnetic field is arranged corresponding to each of the coil wirings 7a, 7b and 7c disposed on the lower surface of the coil support 4. The hall element 13a, 13b, 13c is connected to the control circuit of the CPU through a terminal of the connector 9.

The above-mentioned structure of the linear motor operates by having, a driving current applied to the coil wirings 7a, 7b and 7c through the connector 9 from an outside drive circuit so that the moving body 1 is linearly driven to move on the stator 2 due to the magnetic effect generated between the armature 7 and the magnets 12.

It is to be noted that each hall elements 13a, 13b, 13c detects the electric field generated from the magnet 12 facing to the element. The detection signal is transmitted to the control circuit of the CPU so as to control the timing of changing the energizing the magnets 12. Therefore, it is possible to detect the position of the moving body 1 without using a brush.

As mentioned above, the moving coil type linear motor is controlled by the CPU in such a way that a current is applied to each of the coil wirings 7a, 7b and 7c in accordance with the program applied to the CPU so as to desirably drive the moving body 1 to move linearly on the stator.

However, the control operation signal of the CPU is sometimes disturbed by a noise from outside so that the coil wirings 7a, 7b and 7c which are controlled in accordance with the program malfunction whereby the moving body 1 becomes uncontrollable. Thus, the moving body 1 overruns the stator 2 out of the base plate 10 and damages the motor system.

Such a problem is obviated by an embodiment of the linear motor in accordance with the present invention described below.

The embodiment of the present invention is described hereinafter with reference to FIGS. 4 to 7. In the drawings, the same parts as the above-mentioned structure of FIGS. 1 to 3 are designated by the same numerals.

The moving coil type linear motor 14 in accordance with the present invention comprises a moving body 15 having a hall element 16 for changing the magnetic field attached on the bottom surface thereof and a sensor probe unit 17 attached on the side edge of the body 15.

Numeral 18 designates a stator which comprises a plurality of magnets 12 arranged in a row along the longitudinal direction of the base plate 10. End indicating magnets 12a are disposed in the vicinity of both ends of the stator 18 within the row of the magnets 12. The end indicating magnets 12a are of the same polarity and have a magnetic flux density larger than the other magnets 12. Each of the end magnets 12a is disposed at a position where the hall element 16 faces to the magnet 12a when the moving body 15 is moved to an end position of the moving range thereof.

A position detecting sensor 19 having a rail shape is disposed facing to the sensor probe unit 17 attached to the moving body 15 along a side edge of the stator 18.

Figure 6:
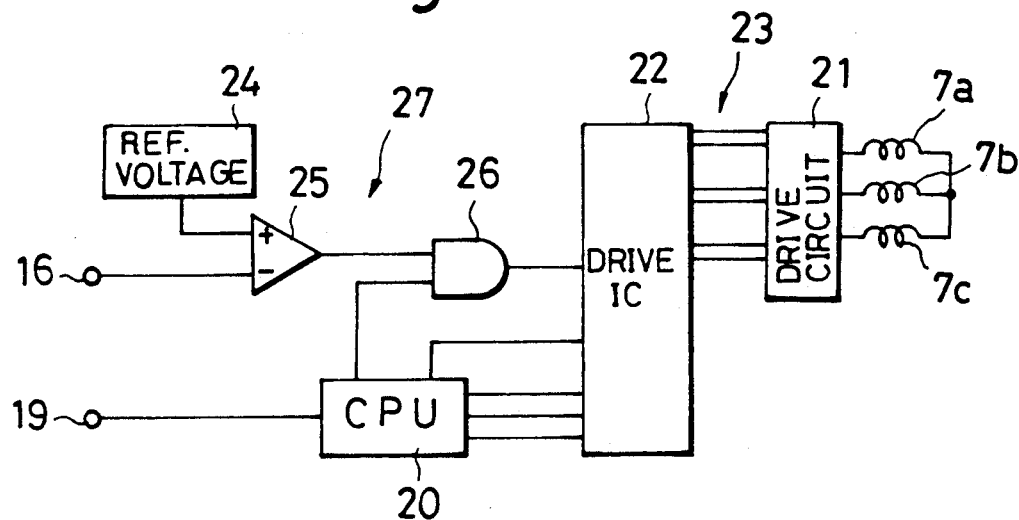
FIG. 6 is a block diagram of the linear motor of FIG. 4.
Figure 7:
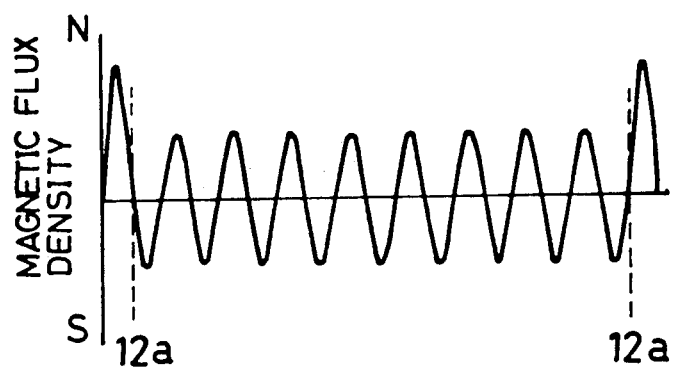
FIG. 7 is a graphical view of a magnetic flux density characteristic.

FIG. 6 illustrates a control circuit diagram of the above-mentioned linear motor 14. The sensor 19 is connected to the CPU 20 which is connected to a driving IC 22. The coil wirings 7a, 7b and 7c of the moving body are also connected to the driving IC 22 through a drive circuit 21. A driving circuit 23 is constituted from the circuit 21 and the IC 22.

On the other hand, the hall element 16 and a reference power source 24 are connected to a comparator 25. The comparator 25 and the CPU 20 are connected to the input side of an AND gate 26 which is connected to the IC 22. An overrun prevention circuit 27 is constituted from the power source 24, the comparator 25 and the AND gate 26.

The above-mentioned circuit of the linear motor 14 functions as follows.

The sensor 19 detects the position of the moving body 15 by detecting the sensor unit 17 attached to the body 15. The detection signal from the sensor 19 is transmitted to the CPU 20 which controls the IC 22 in response to the detection signal. The IC 22 controls the power supplied to the coil wirings 7a, 7b and 7c through the drive circuit 21 so that the body 15 is driven to move in a desired direction or stopped.

It is to be noted that the program control of the IC 22 by the CPU 20 can be executed by outputting a Start/Stop signal and a CW/CCW (Clock Wise/Counter Clock Wise) signal from the CPU 20 with the use of Hi/Low signals, respectively.

In the event that the CPU 20 is disturbed by noise, for instance, so that the motor 14 becomes uncontrollable, when the moving body 15 runs to the end of the stator 18, the end indicating magnet 12a is detected by the hall element 16 of the moving body 15.

More precisely, the hall element 16 always detects the magnetic flux density of the magnet 12 which is facing to the hall element following to the movement of the moving body 15. The difference between the detection signal and the reference voltage 24 is calculated by the comparator 25. The magnetic flux density of the magnet 12a is larger than that of the other magnets 12. Therefore, the comparator 25 outputs an 'H' signal for the magnets 12 while it outputs an 'L' signal for the end indicating magnet 12a. As mentioned before, the Start/Stop signal from the CPU 20 is also output by 'H' or 'L' signal. The signal from the CPU 20 and the output signal from the comparator 25 are input to the gate circuit 26 which outputs a drive signal to the IC 22 in response to the input signals. The relation between the output signals of the comparator 25, the CPU 20 and the IC 22 is exemplified in the following table.

| Comparator 25 | CPU 20 | Drive IC 22 |
| --- | --- | --- |
| H | H | H |
| H | L | L |
| L | H | L |
| L | L | L |

As can be seen from the table, in the normal state of the linear motor 14 wherein the comparator 25 outputs an 'H' signal, the drive IC is controlled by the CPU 20 and outputs 'H' (start) or 'L' (stop) signal in response to the signal from the CPU 20. On the other hand, when the moving body reaches the end of the moving range, that is when the comparator 25 outputs an 'L' signal, the drive IC outputs an 'L' (stop) signal irrespective of the output signal from the CPU 20 so that the moving body 15 is stopped.

Figure 8:
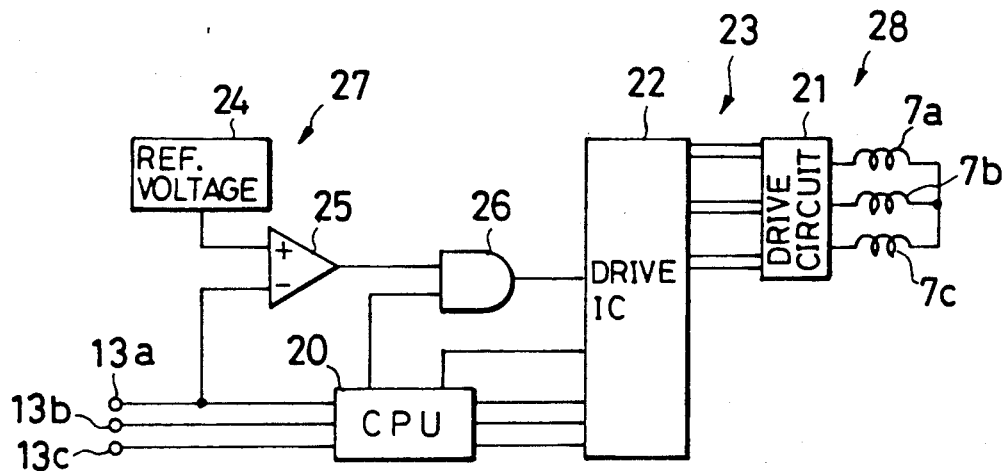
FIG. 8 is a block diagram of another embodiment of the moving coil type linear motor in accordance with the present invention.

FIG. 8 illustrates another embodiment of the moving coil type linear motor in accordance with the present invention.

Figure 2:
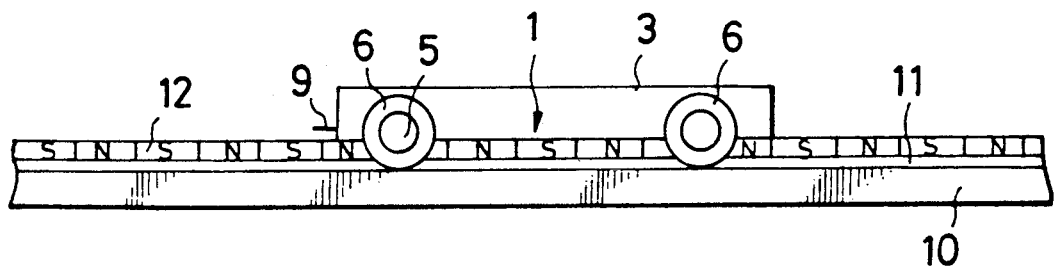
FIG. 2 is a side view of the linear motor of FIG. 1.
Figure 3:
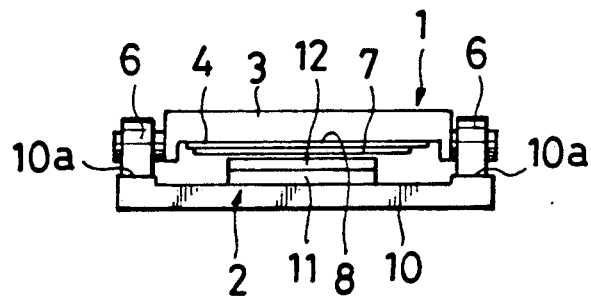
FIG. 3 is a front view of the linear motor of FIG. 1.

The linear motor 28 of this embodiment has a mechanical structure which is similar to that of FIGS. 1 to 3. The feature of this embodiment resides in that one of the hall elements 13a, 13b and 13c for changing the timing of energizing the coil is connected to the comparator 25 which constitutes the overrun prevention circuit 27.

The function operation of the above-mentioned circuit is substantially the same as that of FIG. 6.

In accordance with the circuit of FIG. 8, the detection signal from the hall element 13a is used to prevent the moving body 15 from overrunning. That is, the structure of this linear motor 28 can be realized by adding the overrun prevention circuit 27 comprising the comparator 25 and the gate circuit 26 to the linear motor of the related art which has been already prepared in the user's installation and also adding the end indicating magnets 12a having a large magnetic flux density to the stator 2. Therefore, it becomes possible to very easily produce the moving coil type linear motor which enables to prevent the moving body from overrunning.

It is to be noted that the large magnetic flux magnet 12a can be arranged by implanting a magnet having a strong magnetic force in the stator or increasing the thickness of the magnet 12 at the position where the end indicating magnet 12a is to be disposed.

As mentioned above, in accordance with the embodiment of the present invention, the moving coil type linear motor is composed of a stator comprising a plurality of magnets continuously disposed in a row and a movable body disposed on the stator wherein end indicating magnets having a larger magnetic flux density than the other magnets are arranged in the vicinity of the both ends of the stator and the movable body is provided with a magnetic field sensor element facing to the magnets of the stator and wherein an overrun prevention circuit is arranged in parallel to the control circuit so as to control the output of the drive circuit in response to the detection signal from the sensor of the magnetic field. Therefore, for example, in the event that the control circuit malfunctions and the movable body becomes uncontrollable, when the movable body reaches the end of the stator, the sensor element detects the end indicating magnet and outputs the end detection signal to the control circuit to drive the overrun prevention circuit so that the movable body is stopped, which prevents the movable body from overrunning and the motor system from being damaged.

Also, since the overrun prevention circuit is arranged in parallel to the control circuit, in the normal state of the motor system, the movable body is controlled by the control circuit, while only in the state wherein the system malfunctions, the movable body is stopped by the overrun prevention circuit irrespective of the output of the control circuit, whereby the motion of the movale body is reliably controlled and limited without impairing the normal function of the motor system.

Also, in accordance with the second embodiment of the present invention, the moving coil type linear motor comprises a stator and a movable body having a magnetic field sensor element which outputs a positional signal in response to the position of the movable body so as to control the output of the drive circuit, wherein end indicating magnets having larger magnetic flux density than the other magnets are arranged in the vicinity of both ends of the stator and wherein an overrun prevention circuit is arranged in parallel to the control circuit to control the output of the drive circuit in response to the detection signal from the sensor element which detects the end indicating magnet. Due to such an arrangement, it becomes possible to realize the overrun-prevented linear motor simply by adding the overrun prevention circuit and the end indicating magnets to the motor system which has already assembled in the user's installation. Therefore, it becomes possible to easily obtain a linear motor in which the movable body is reliably prevented from overrunning and the damage of the motor is avoided.

Figure 9:
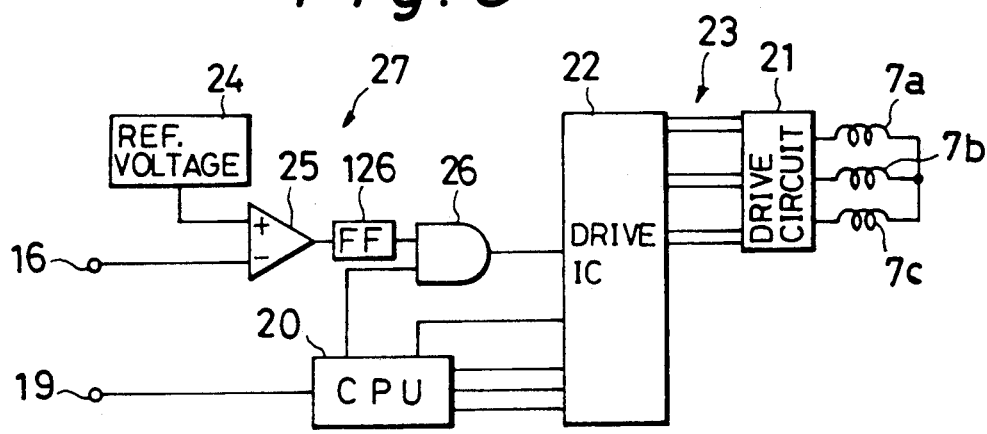
FIG. 9 is a block diagram of still another embodiment of the moving coil type linear motor in accordance with the present invention.

FIG. 9 illustrates a block diagram of a still another embodiment of the moving coil type linear motor in accordance with the present invention.

The essential structure of this embodiment of FIG. 9 is substantially the same as that of FIG. 6. A feature of the circuit of FIG. 9 resides in that the output side of the comparator 25 is connected to the input of the AND gate 26 through a flip-flop (FF) circuit 126 which functions as a retaining circuit for holding the output signal from the comparator 25.

Figure 4:
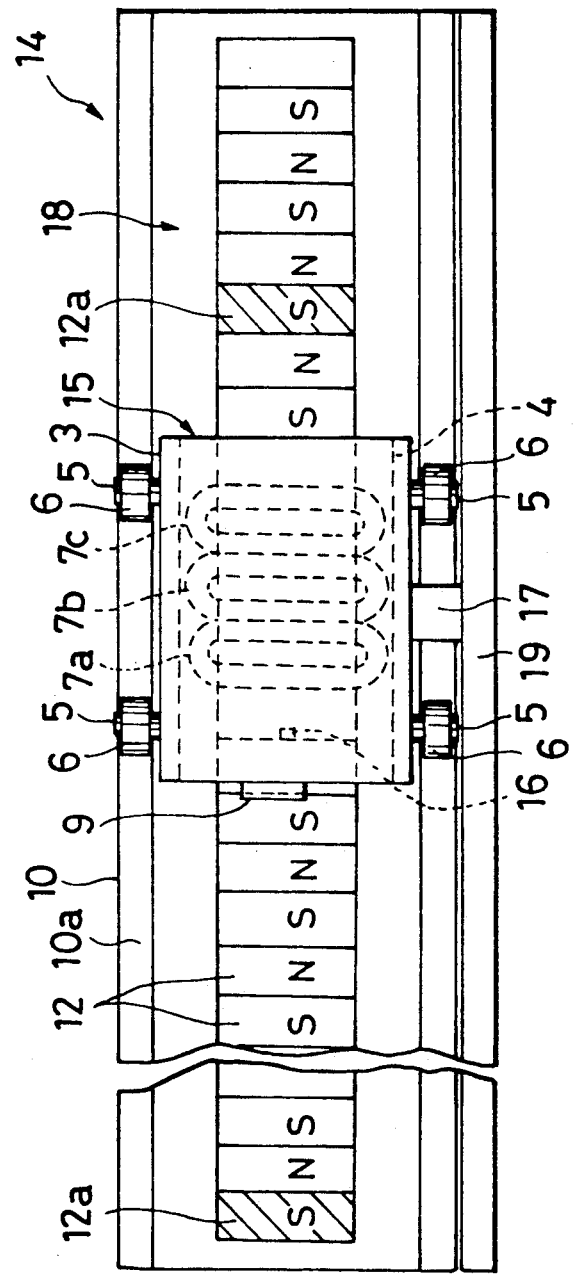
FIG. 4 is a plan view of an embodiment of the moving coil type linear motor in accordance with the present invention.
Figure 5:
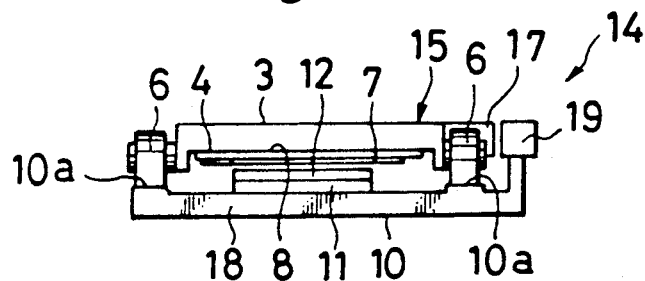
FIG. 5 is a front view of the linear motor of FIG. 4.

The structure of FIG. 9 functions in substantially the same way as the linear motor of FIGS. 4 to 6, mentioned above, wherein the movable body 15 is prevented from overrunning due to the arrangement in which the hall element 16 attached to the bottom of the body 15 detects the end indicating magnet 12a.

However, in the event that the movable body has a large inertia so that the body moves over the end position where the hall element 16 is dislocated from the end indicating magnet 12a, the hall element 16 detects a low magnetic flux density of magnet 12 or outside of the magnet row, which results in that the output of the comparator 25 becomes 'H' again so that the movable body may run again.

The above-mentioned possible problem can be obviated by the structure of FIG. 9 wherein once the comparator 25 outputs the 'L' signal to stop the movable body 15, the flip-flop circuit 126 retains the 'L' signal to be transmitted to the AND gate 26. Therefore, the moving body 15 is reliably stopped even if the stopped position should be dislocated from the predetermined end position.

Figure 10:
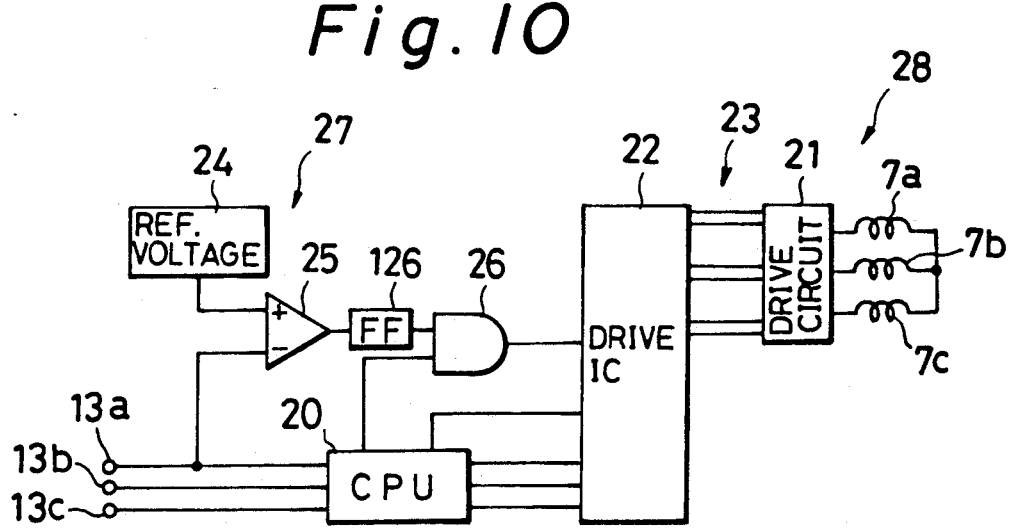
FIG. 10 is a block diagram of a further embodiment of the moving coil type linear motor in accordance with the present invention.

FIG. 10 illustrates a block diagram of a further embodiment of the moving coil type linear motor in accordance with the present invention.

This embodiment is a variant from the embodiment of FIG. 8. The difference resides in that the output of the comparator 25 is connected to the gate circuit 26 through a flip-flop (FF) circuit 126. The FF circuit 126 retains the output signal from the comparator 25, as explained with reference to FIG. 9 before, so that the movable body is reliably stopped.

Other constructions and function of the embodiment of FIG. 10 is substantially the same as those of FIG. 9.

Figure 11:
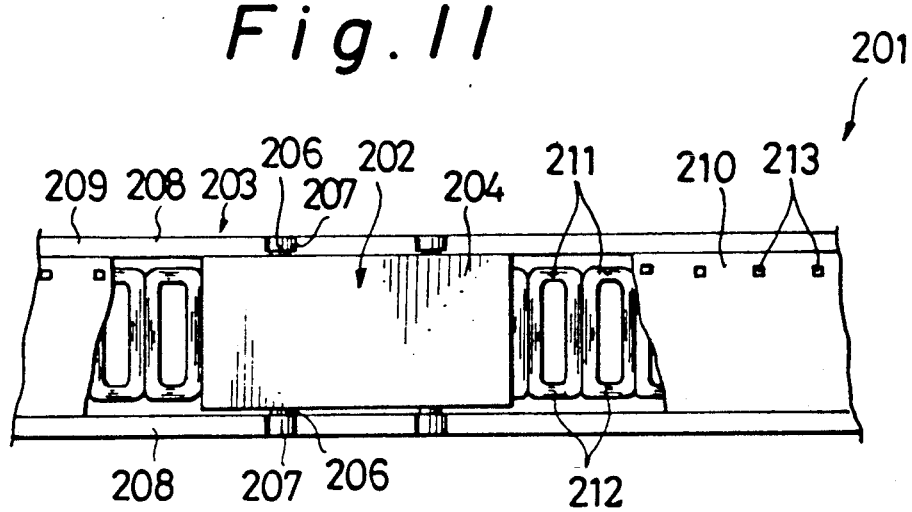
FIG. 11 is a plan view of an example of the moving magnet type linear motor in accordance with the related art.
Figure 12:
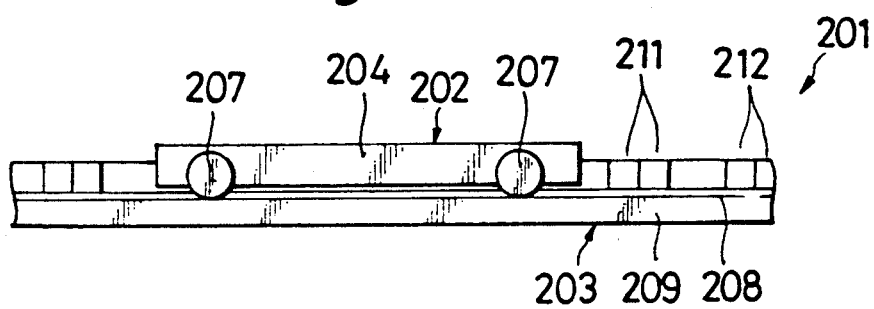
FIG. 12 is a side view of the linear motor of FIG. 11.
Figure 13:
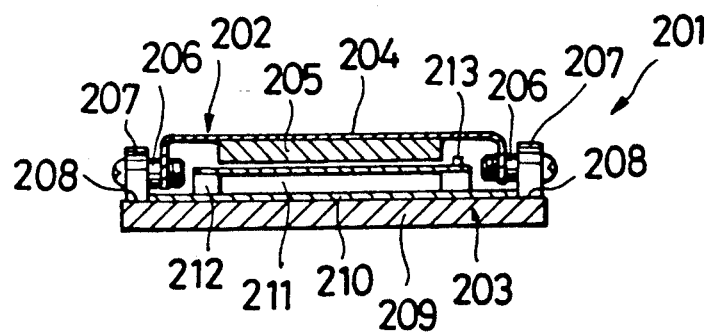
FIG. 13 is a front view of the linear motor of FIG. 11.

FIGS. 11 to 13 illustrate an example of the moving magnet type linear motor in accordance with the related art.

A moving magnet type DC linear motor 201 is composed of a moving body (movable body) 202 and a stator 203. The moving body 202 comprises a yoke 204 having a U-shaped section, magnets 205 attached to the lower surface of the yoke 204, and wheels 207 each rotatably being attached to each of axles 206 disposed at the four corners of the yoke 204. The magnets 205 are arranged so that the poles N and S are alternately disposed along the longitudinal direction of the stator 203.

On the other hand, the stator 203 comprises a longitudinal base plate 209 having a guide step (or groove) 208 on either side thereof for guiding the wheels 207, a stator yoke 210 fixed on the base plate 209 along the longitudinal center line thereof, a plurality of armatures 212 continuously disposed on the yoke 210 each armature 212 being composed of a coil 211, and hall elements 213 for changing the magnetic field each disposed on one side of each armature 212.

The coils 211 formed on the stator 203 face to the magnet 205 of the moving body 202 through a predetermined gap. Each coil 211 along with the hall element 213 is connected to a drive control circuit (not shown) of a CPU.

To function the above-mentioned construction of the moving magnet type linear motor 201, a current is selectively applied to a coil 211 so that the moving body 202 is linearly moved on the stator 203 due to the magnetic effect between the coil 211 and the magnet 205.

It is to be noted that in accordnce with the above-mentioned structure of the moving magnet type linear DC motor 201, each hall element 213 detects the magentic field generated from the magnet 205 facing to the coil 211 and the detection signal is transmitted from the hall element 213 to the drive control circuit of the CPU so that it becomes possible to detect the position of the moving body 202 without using a brush.

In accordance with the above mentioned moving magnet type linear DC motor 201, the current supplied from the drive control circuit to each of the coils 211 is controlled by the CPU in accordance with the program arranged in the CPU so as to desirably drive the moving body 202 to move linearly.

However, the control signal from the CUP is sometimes distrurbed by the noise from outside, which results in malfunction of coils and makes the moving body 202 uncontrollable. This causes that the moving body 202 overruns the stator 203 out of the base plate 209 and damages the motor system.

Such a problem can be obviated by the embodiments of the present invention described below.

Figure 14:
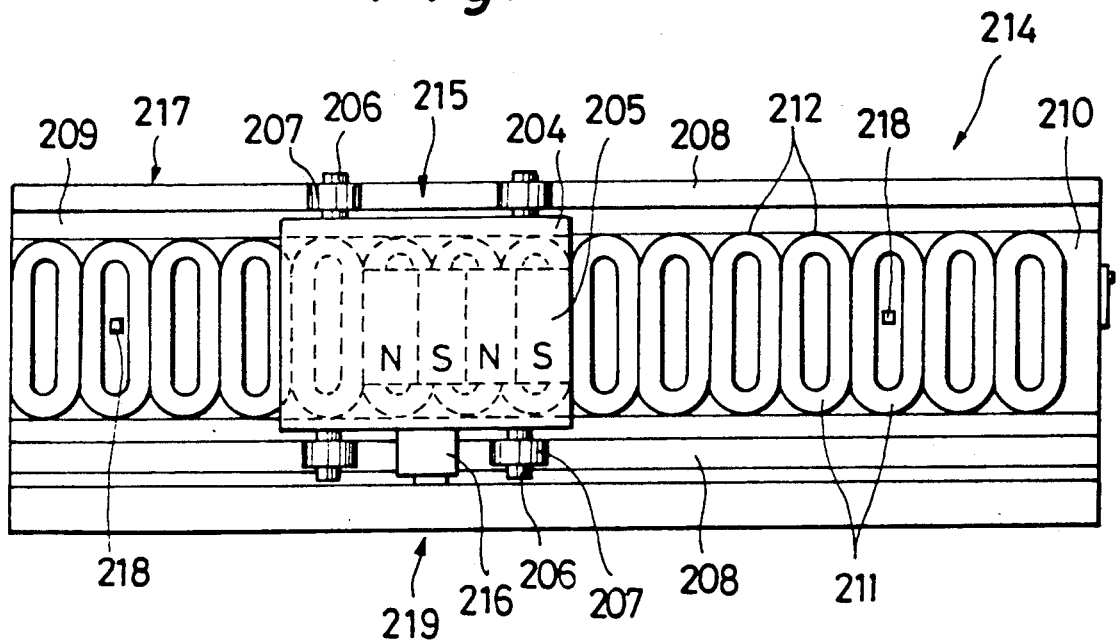
FIG. 14 is a plan view of an embodiment of the moving magnet type linear motor in accordance with the present invention.
Figure 15:
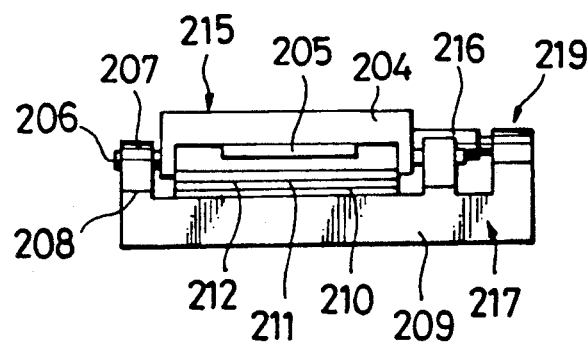
FIG. 15 is a front view of the linear motor of FIG. 14.

FIGS. 14 and 15 illustrate an embodiment of the moving magnet type linear motor in accordance with the present invention.

Numeral 214 designates as a whole a moving magnet type linear motor which comprises a movable body 215 having a sensor probe unit 216 attached on a lateral side thereof.

The motor 214 also comprises a stator 217 having hall elements 218 arranged in the vicinity of both ends thereof. Each hall element 218 is disposed at a position where the magent 205 of the movable body 215 faces to the element 218 when the movable body 215 is positioned at the end of the moving range. The stator 217 also comprises a rail-like position sensor 219 disposed facing to the sensor probe unit 216.

The circuit structure of the above mentioned linear motor of FIGS. 14 and 15 is substantially the same as that of FIG. 6. Also, the circuit diagram of FIG. 9 can be applied to the linear motor of FIGS. 14 and 15.

In accordance with the circuit structure mentioned above, the relation between the outputs of the comparator, the CPU, and the drive IC is the same as that represented in the table described before.

Figure 16:
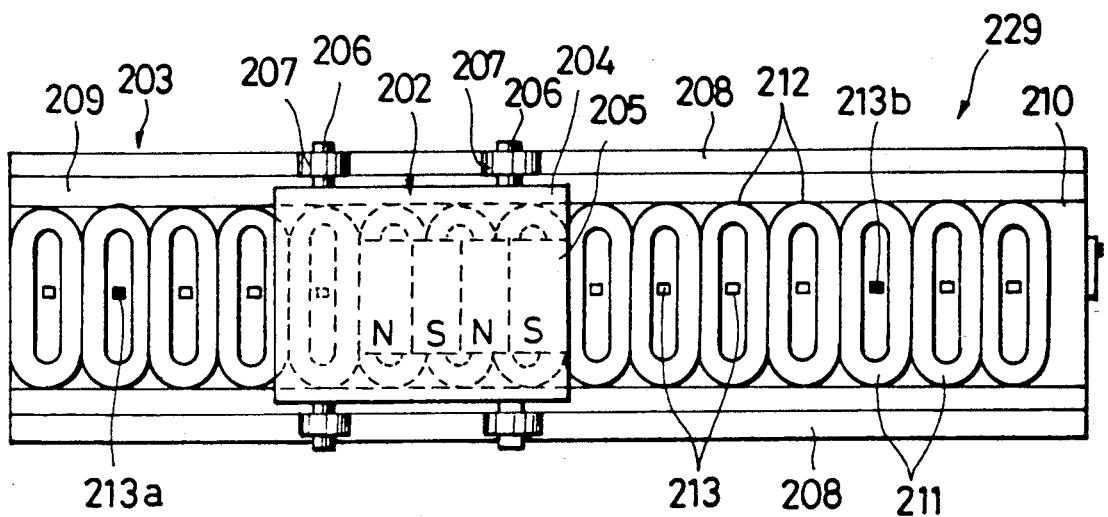
FIG. 16 is a plan view of another embodiment of the moving magnet type linear motor in accordance with the present invention.
Figure 17:
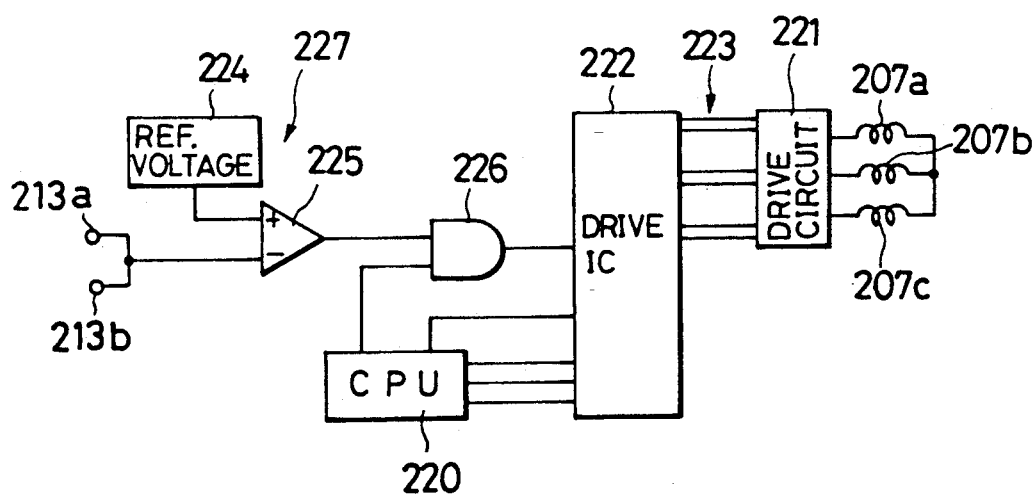
FIG. 17 is a block diagram of the linear motor of FIG. 16.

FIG. 16 illustrates another embodiment of the moving magnet type lienar motor in accordance with the present invention. Also, FIG. 17 illustrates the circuit structure of the linear motor of FIG. 16.

The moving magnet typle linear motor 229 of FIG. 16 has a structure improved from that of FIGS. 11 to 13. The motor 229 comprises hall elements 213a and 213b each having a higher sensitivity than the other hall elements 213. The high sensitive hall elements 213a and 213b are disposed in the vicinity of both ends of the stator 203. The elements 213a and 213b are connected to the comparator 225 of the overrun prevention circuit 227. Each of the hall elements 213 is disposed at the center of each coil 211.

The motor 229 functions substantially in the same way as the motor 214 of FIG. 14, mentioned above.

In accordance with the structure of the motor 229, the movable body 215 is prevented from overrunning by using the detection signal from the hall elements 13a and 13b which are inherently arranged for changing the timing of magnetization. Therefore, the motor 229 can be assembled by adding the comparator 225 and the gate circuit 226 to constitute the overrun prevention circuit 227 to the motor system which is already equipped in the user's installation and arranging the high sensitive hall elements 13a and 13b near the ends of the stator. Thus, it becomes possible to realize the moving magnet type linear motor having a simple structure in which the movable body is reliably prevented from overrunning.

Figure 18:
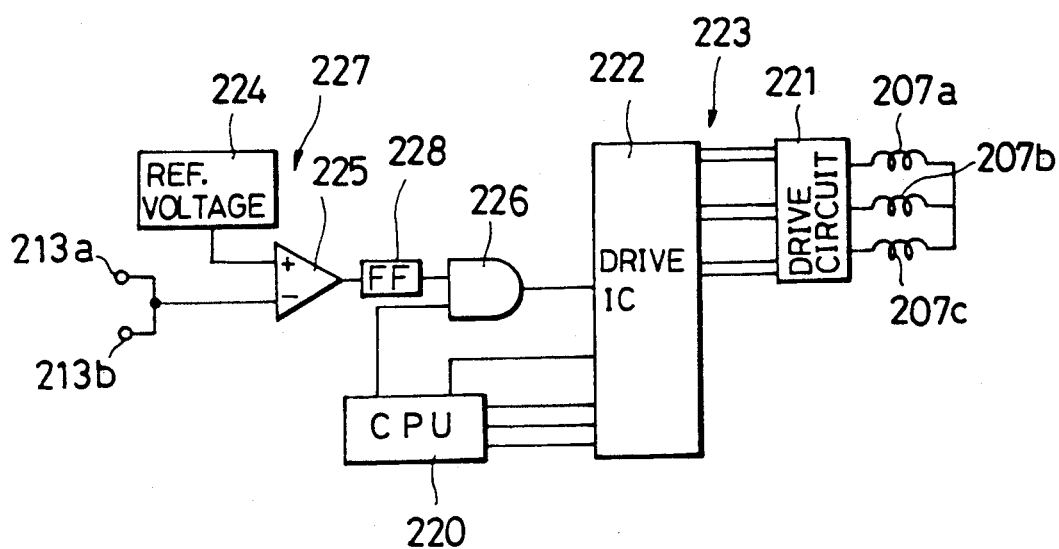
FIG. 18 is a block diagram of still another embodiment of the moving magnet type linear motor in accordance with the present invention.

It is to be noted that, as illustrated in FIG. 18, a flip-flop circuit 228 may be arranged between the comparator 225 and the gate 226 to more reliably prevent the overrunning of the movable body 215.

Many widely different embodiments of the present invention may be consitituted without departing from the spirit and scope of the present invention. It should be understood that the present invention is not limited to the specific embodiments described in the specification, except as defined in the appended claims.

What is claimed is:

1. A linear motor comprising:
a stator having a running track extending in a longitudinal direction thereof;
a movable body disposed on said stator and being linearly movable along said longitudinal direction of said stator;
an end detection means for detecting a state that said movable body is positioned at an end of said stator and for outputting a detection signal upon detecting said state;
a drive means for moving said movable body on said stator;
a control means for controlling the moving and stopping of said movable body; and
an overrun prevention means connected to said end detection means, said control means and said drive means for preventing said movable body from overrunning out of said stator, said overrun prevention means having an AND circuit, an input side of said AND gate being coupled to said end detection means and said control means, an output of said AND gate being connected to said drive means,
said overrun preventing means and said drive means being adapted such that the moving and stopping of said movable body is controlled by said control means when said overrun prevention means does not receive the detection signal from said end detection means, and that said overrun prevention means outputs a stop signal to stop the moving of said movable body to said drive means upon receiving of the detection signal from said end detection means.

2. A linear motor comprising:
a stator having a running track extending in a longitudinal direction thereof and a plurality of magnets disposed along said longitudinal direction;
a movable body disposed on said stator and being linearly movable along said longitudinal direction of said stator, said movable body having coils to constitute a moving coil type linear motor;
an end detection means for detecting a state that said movable body is positioned at an end of said stator and for outputting a detection signal upon detecting said state, said end detection means having a magnet sensor attached to said movable body to detect a magnet which is disposed at each end of said stator and has a magnet flux density greater than that of another magnet constituting said stator;
a drive means for moving said movable body on said stator;
a control means for controlling the moving and stopping of said movable body; and
an overrun prevention means connected to said end detection means, said control means and said drive means for preventing said movable body from overrunning out of said stator,
said overrun preventing means and said drive means being adapted such that the moving and stopping of said movable body is controlled by said control means when said overrun prevention means does not receive the detection signal from said end detection means, and that said overrun prevention means outputs a stop signal to stop the moving of said movable body to said drive means upon receiving of the detection signal from said end detection means.

3. A linear motor comprising:
a stator having a running track extending in a longitudinal direction thereof and a plurality of coils disposed along said longitudinal direction;
a movable body disposed on said stator and being linearly movable along said longitudinal direction of said stator, said movable body having magnets to constitute a moving magnet type linear motor;
an end detection means for detecting a state that said movable body is positioned at an end of said stator and for outputting a detection signal upon detecting said state, said end detection means having a magnet sensor disposed at each end of said stator to detect said magnet of said movable body;

a drive means for moving said movable body on said stator;

a control means for controlling the moving and stopping of said movable body; and an overrun prevention means connected to said end detection means, said control means and said drive means for preventing said movable body from overrunning out of said stator, said overrun preventing means and said drive means being adapted such that the moving and stopping of said movable body is controlled by said control means when said overrun prevention means does not receive the detection signal from said end detection means, and that said overrun prevention means outputs a stop signal to stop the moving of said movable body to said drive means upon receiving of the detection signal from said end detection means.

4. A linear motor according to claim 3, in which said magnetic sensor comprises:

a hall element.

5. A linear motor according to claim 4, in which said hall element is connected to a comparator which compares the detection signal from said hall element with a reference voltage and transmits an output signal to an AND gate to which said control means is also connected, said AND gate transmits the stop signal to said drive means.

6. A linear motor according to claim 5, in which a flip-flop circuit is disposed between said comparator and said AND gate to retain the output signal from said comparator.

* * * * *